United States Patent [19]

Wieme et al.

[11] Patent Number: 4,544,915
[45] Date of Patent: Oct. 1, 1985

[54] ADJUSTABLE DIGITAL ENCODER

[75] Inventors: Samuel P. Wieme, Wayne; Robert Williams, Randolph, both of N.J.

[73] Assignee: Sun Chemical Corporation, New York, N.Y.

[21] Appl. No.: 99,432

[22] Filed: Dec. 7, 1979

[51] Int. Cl.$^4$ ............................................ H03K 13/00
[52] U.S. Cl. ............................ 340/347 P; 340/347 M; 250/231 SE
[58] Field of Search .................. 340/347 M, 347 P; 250/231 SE; 235/454

[56] References Cited

U.S. PATENT DOCUMENTS

| | | | |
|---|---|---|---|
| 2,685,083 | 7/1954 | Beman | 250/231 SE X |
| 3,123,818 | 3/1964 | Steele | 340/347 P |
| 3,268,887 | 8/1966 | Sullivan | 340/347 P |
| 3,614,898 | 10/1971 | Paine | 74/89.15 |
| 3,693,023 | 9/1972 | Wasserman | 250/231 SE |
| 3,738,504 | 6/1973 | Vail et al. | 340/347 M X |
| 3,894,232 | 7/1975 | Laspesa | 250/231 SE |
| 3,902,063 | 8/1975 | Oelsch et al. | 250/231 SE X |
| 4,031,441 | 6/1977 | Garrett | 250/231 SE X |
| 4,088,265 | 5/1978 | Garczynski | 235/454 X |
| 4,181,962 | 1/1980 | West, Jr. et al. | 235/92 MP X |

OTHER PUBLICATIONS

Brown, Five Hundred and Seven Mechanical Movements, Brown & Seward, 1893, pp. 30-31.
Rabe, 20 Dynamic Applications for Screw Threads, Product Engineering, 29 Feb. 1960, pp. 43-46.
Schwamb et al, Elements of Mechanism, John Wiley & Sons, Inc., 1904, pp. 372-373.

Primary Examiner—T. J. Sloyan
Attorney, Agent, or Firm—Cynthia Berlow; Mitchell Bittman

[57] ABSTRACT

An adjustable encoder includes a source generating a first signal and transmitting it to a transducer element for generating an electrical signal responsive to the first signal. An object is rotated between the source and the transducer element so as alternately to block and to permit or unblock the path of the first signal from its source to the transducer element. The transducer element and the source are simultaneously movable parallel to the plane of rotation of the rotatable object, so that the exact timing of interruption of the first signal can be adjusted while the encoder is in operation.

4 Claims, 4 Drawing Figures

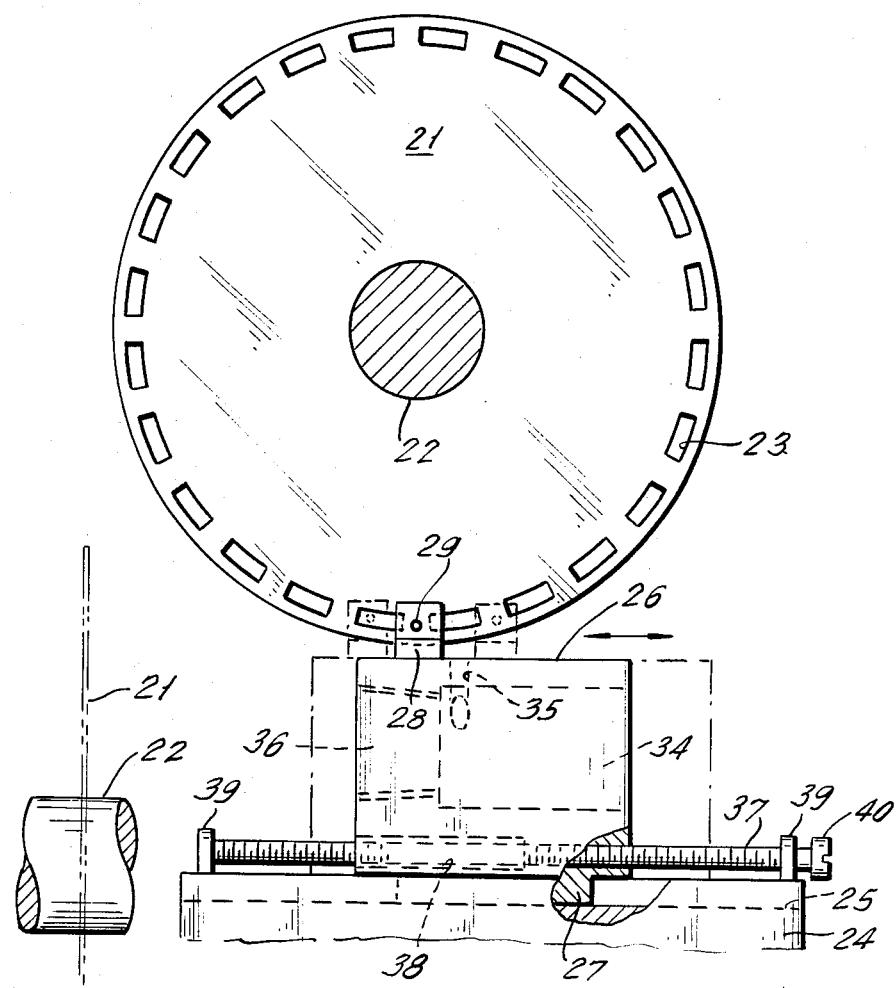
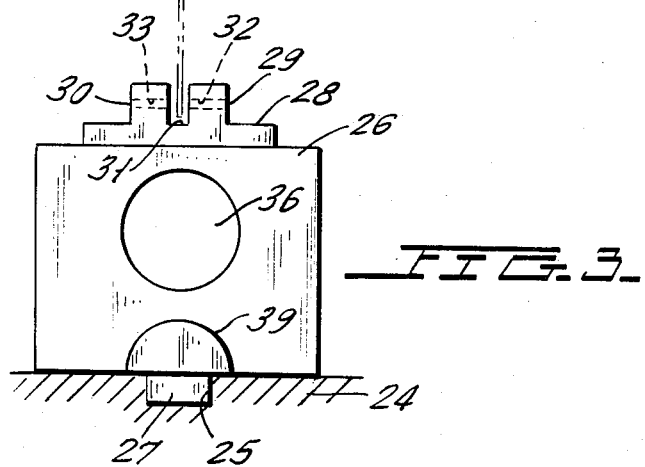
FIG. 2.
FIG. 3.

ADJUSTABLE DIGITAL ENCODER

BACKGROUND OF THE INVENTION

This invention pertains to digital encoders of the type utilizing an opaque rotating disc provided with transparent sections the relative location of which provides the desired encoding.

One machine commonly used for decorating or merely coating cans and similar containers is the so-called continuous motion decorator to which a continuous stream of cans to be decorated is fed. A large wheel, rotating in its own plane, is provided with a plurality of mandrels mounted perpendicular to the wheel around its circumference. Each mandrel is mounted by one end in such a way as to be able to move towards the center of the wheel. Each can to be decorated is mounted on a mandrel, and rotation of the wheel brings each can in turn into contact with a printing roller, which prints the desired pattern on the exterior of the can, after which the rotation of the wheel withdraws the can from contact with the printing roller. This type of decorator is disclosed in U.S. Pat. No. 4,140,053 issued Feb. 20, 1979 to J. P. Skrypek, et al for a Mandrel Mounting and Trip Mechanism for Continuous Motion Decorator.

Sometimes a can is placed on a mandrel improperly or no can is placed on the mandrel at all. An improperly mounted can is removed from the mandrel by a blast of air and any mandrel without a can mounted on it is then moved toward the center of the wheel in order to prevent contact between the mandrel and the printing roller. This is necessary because any ink or varnish applied to a mandrel would be applied to the interior of the next can mounted on that mandrel, ruining that can and possibly causing it to stick to the mandrel. In the latter case it would be necessary to stop the machine in order to remove the can and to clean the mandrel.

To determine when a mandrel which is about to enter the decorating zone is improperly loaded or unloaded, a metal detector or other convenient detection means is located adjacent to the wheel. A timing device, commonly a digital encoder, is employed to activate the metal detector whenever a mandrel is expected to be passing the detector. Such an encoder typically comprises an opaque disc provided with a plurality of evenly spaced transparent openings about its circumference. The disc is rotated about its axis at a uniform speed such that one of the transparent openings passes a photocell each time one of the mandrels passes the detector. The photocell and its light source are placed on opposite sides of the encoder disc in such a way that when one of the openings in the disc passes between them, the light source illuminates the photocell, actuating the latter causing the associated metal detector to be actuated so that it then "looks for" a properly mounted can on the mandrel which is passing the detector at this time.

In order for the above-described arrangement to work properly, it is essential that one of the openings in the encoder disc pass between the photocell and the light source at exactly the instant when a mandrel passes the metal detector. If this coordination is lacking, it is generally necessary to stop the can decorator altogether and readjust the encoder for proper synchronization. This prior art procedure is no more than trial and error so that very often many intermediate adjustments must be made in order to obtain a prcise setting. Because of the great size of the decorator, this procedure is extremely cumbersome and inconvenient.

SUMMARY OF THE INVENTION

It is therefore the principal object of this invention to provide a simple means for conveniently adjusting the synchronization between the mandrel wheel and the metal detector of a continuous decorator or the like.

It is a further object of this invention to provide a means for doing so without the necessity of halting the operation of the decorator.

These objects are achieved according to the present invention by providing a disc rotating about its axis of symmetry and providing it with a selected number of transparent regions evenly spaced about its circumference, the remainder of the disc being opaque. A photoelectric cell is positioned on one side of the disc, and a light source on the other, these two elements being arranged so that a light beam from the light source will alternately be blocked by the opaque portions of the circumference of the disc and be permitted to pass by the transparencies therein. The photoelectric cell can be connected to activate the metal detector or other control means for the mandrel trip of the continuous decorator. The light source and the photoelectric cell are fixed in position relative to each other but are mounted so that they can be moved as a unit in either direction parallel to the plane of the disc while the continuous decorator is in operation. In this manner, if the mandrel trip control of the decorator is not operating perfectly synchronously with the mandrel wheel, the timing of the activation of the mandrel trip control can be finely adjusted by moving the photoelectric cell and light source unit slightly with respect to the disc.

These and other features and advantages of the present invention will become clearer upon consideration of the following detailed description thereof taken in conjunction with the accompanying Figures, in which like reference numerals denote like elements.

BRIEF DESCRIPTION OF THE FIGURES

FIG. 2 shows a side elevation of one preferred embodiment of the present invention.

FIG. 3 shows an end side view of the embodiment of FIG. 2.

DETAILED DESCRIPTION OF THE INVENTION

Figure 1:
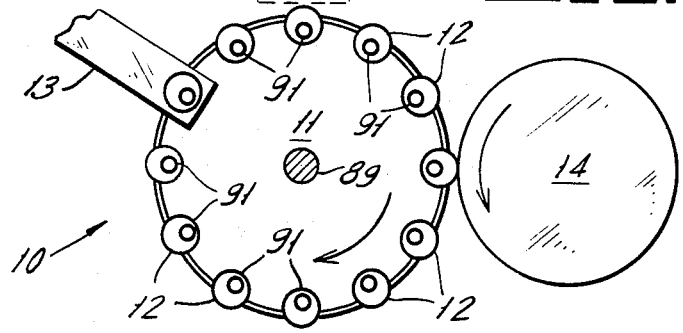
FIG. 1 is a schematic view of a portion of a continuous motion decorator which includes the present invention.

FIG. 1 is a schematic view of a portion of a continuous decorator 10 of the type with which the present invention is to be used. Such a decorator includes a mandrel wheel 11. Equally spaced around the circumference of wheel 11 and mounted thereto are a selected number of mandrels 12. While a typical decorator has twenty-four mandrels, for the sake of simplicity only twelve mandrels are shown in FIG. 1. Each mandrel 12 is rotatably mounted on an axis perpendicular to the plane of the mandrel wheel 11. Loading device 13 is provided for mounting the cans on the mandrels 12. Decorating or printing wheel wheel 14 rotates counterclockwise as mandrel wheel 11 rotates clockwise, coating each can with ink or varnish as it passes. A metal detector 15 is provided between the point at which cans are placed on the mandrels 12 and the point at which they come into contact with the decorating wheel 14. The metal detector 15 is activated as each mandrel 12 passes by it and determines whether the mandrel 12 passing has a can properly mounted on it or not. If not, circuitry (not shown) activated by the metal detector 15 causes a blast of air to be fired along the length of the mandrel 12 to blow off any can improperly mounted thereon before the latter reaches decorating wheel 14. At the same time eccentric device 91 is actuated to move mandrel 12 in question toward center 89 of the mandrel wheel 11 to prevent this unloaded mandrel 12 from coming into contact with decorating wheel 14. Actuation of the metal detector 15 is controlled by the timing circuit 16, shown in FIG. 1 as a box, which is replaceable by the device of the present invention.

FIG. 2 shows a front view of one preferred embodiment of the present invention. An opaque disc 21 is mounted for rotation about its axis of symmetry on an axle 22. The latter is mechanically connected to shaft 89 of mandrel wheel 11 to be driven in unison with the latter. A plurality of transparent sections 23 are located evenly spaced around the circumference of the disc 21. As shown in FIG. 2, twenty-four transparent sections 23 are provided at 15° intervals, one transparent section 23 for each mandrel 12 on the mandrel wheel 11 of the decorator 10 with which the encoder of the invention is used.

Below the axle 22 is a fixed base 24 the upper surface of which is provided with a groove 25 parallel to and directly beneath disc 21. On base 24 is mounted a block 26 the underside of which has a projection 27 designed to engage the groove 25 of base 24 and permit block 26 to be repositioned by sliding it back and forth parallel to and underneath the disc 21. On the top of the block 26 is mounted a smaller block 28 housing a photoelectric element 29 and a light source 30, best seen in FIG. 3. The upper surface of the small block 28 has a relatively deep, narrow groove 31 to clear the lower edge of the disc 21. The portions of the second block 28 directly to each side of groove 31 are provided with small bores 32, 33 perpendicular to the plane of groove 31. Bore 32 in the second block 28 accommodates photoelectric element 29 facing groove 31, and bore 33 accommodates light source 30 facing the photoelectric element 29. The photoelectric element 29 and the light source 30 are at such a height above the base 24 that as the disc 21 rotates, a light beam from the light source 30 will alternately be blocked by the opaque portions of the disc 21 and be passed by the transparent sections 23 thereof. A relatively large bore 34, for example of a one-inch diameter, may be provided in one end of the block 26 to accommodate a printed circuit board (not shown). The photoelectric element 29 can be connected to the circuitry on the printed circuit board by means of wiring led into the 1" bore 34 via a small aperture 35 provided in the upper surface of the block 26 and leading into the interior of the large bore 34. Other wires leading away from the printed circuit board may be led out of the block 26 via a smaller threaded bore 36 provided in the other end of the block 26 and intersecting the interior end of the larger bore 34.

To control the exact positioning of the photoelectric cell 29 with respect to the rotating disc 21, a screw 37 is provided in a third, threaded bore 38 near the lower part of the block 26, parallel to the plane of the disc 21. The screw 37 extends between and is supported by two fixed brackets 39 on the top of the base 24, one bracket 39 on each side of the block 26. One end of the screw 37 is provided with a conventional screw head 40 by means of which it can be rotated in either direction by a screw driver.

By rotating the screw 37 slightly in one direction or the other, the block 26, which engages the screw 37 by means of the threaded third bore 38, is forced to move slightly along the length of the screw 37. Since the disc 21 is rotating while the position of block 26 is being adjusted, the exact time when the photoelectric element 29 will be actuated by a beam from the light source transversing a transparent region 23 in the disc 21 can be varied slightly by moving the block 26 in one direction or the other in this manner. Since disc 21 is rotating at the same speed as the mandrel wheel 11 of continuous decorator 10, it is possible in this manner to adjust the exact time of actuation and deactuation of a metal detector 15 or other mandrel trip device used with the continuous decorator 10. If, when the decorator 10 is turned on, the metal detector 15 is not being actuated at precisely the correct time, it is possible to synchronize it with the decorator 10 while the decorator 10 is in operation, without the expensive and time-consuming necessity of shutting the decorator 10 down to make the adjustment.

Small block 28 and main block 26 are shown and herein described as separate elements, but this embodiment is for ease of fabrication only and is not an essential feature of the invention. A single piece of material could be machined to the proper shape to fulfill the functions of both blocks 26 and 28.

The adjustable encoder described in the preceding paragraphs serves another purpose besides actuating the can detector 15 at the proper times. When the decorator 10 is stopped for an emergency and then restarted, the several cans decorated while the machine 10 is coming to a halt or while it is accelerating back to its minimum operating speed after being restarted receive too heavy a coating of ink or varnish and must be removed from the mandrel wheel 11. The encoder of the invention may be used to discard these improperly decorated cans automatically when the decorator 10 is restarted.

Figure 4:
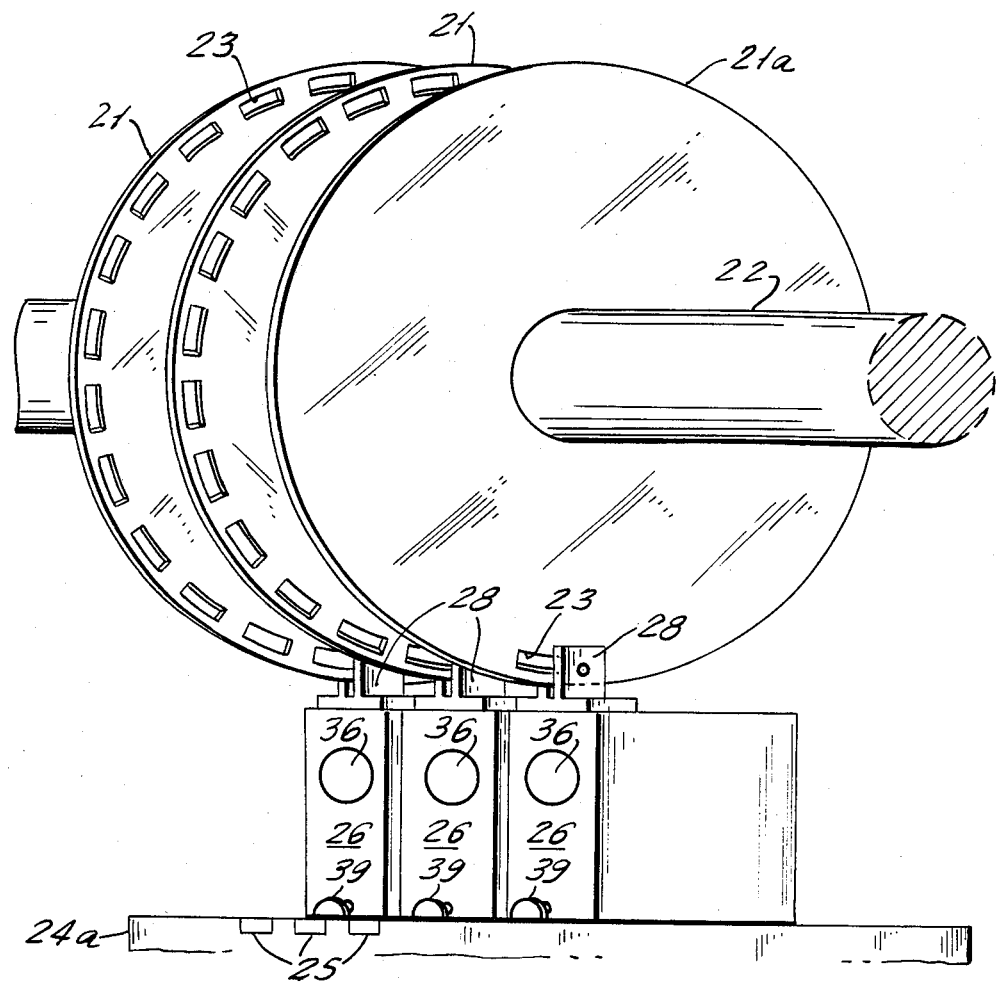
FIG. 4 shows a perspective view of another preferred embodiment of the present invention.

Another preferred embodiment of the present invention is shown in FIG. 4. In this embodiment, the base 24a has three parallel grooves 25 in it, each accommodating the projection 27 of a separate, identical block 26. Each block has an identical small block 28 housing a light source 30 and a photoelectric element 29 on its top, as in the embodiment of FIGS. 2 and 3. Each of the three blocks 26 is mounted on the base 24a in the manner of the embodiment of FIGS. 2 and 3 but can be moved by means of its respective screw 37 independently of the other two blocks 26. Corresponding to each of the three blocks 26 is a separate disc 21 and 21a, all three discs 21 and 21a being mounted on the same shaft 22 for simultaneous rotation at the same speed. Two of the discs 21 are identical and are provided with twenty-four transparent regions 23 each evenly spaced about the circumference. The third disc 21a, however, is provided with only one transparent region 23. One of the discs 21 having twenty-four transparent regions 23 serves the function described in connection with the embodiment of FIGS. 2 and 3, to keep track of the position of each mandrel 12. The third disc 21a, having only one transparent region 23, can be used as a convenient way of counting the revolutions of the mandrel wheel 11, one revolution of which corresponds to one revolution of the one-hole disc 21a.

While the instant invention has been described in connection with utilization of photoelectric means to produce switching signals, it should now be apparent to those skilled in the art that the photo electric signal producing means may be replaced by magnetic signal producing means. For example, a wheel carrying one or more ferrous elements is rotated so that the ferrous elements move through the space between a magnet and a Hall effect sensor. When a ferrous element is in the space the magnetic field is shunted thereby producing a signal change used for switching purposes.

Although the present invention has been described above in detail in connection with several preferred embodiments thereof, many variations and modifications thereof will now be apparent to one skilled in the art. Accordingly, the scope of the present invention is to be limited not by the details of the above description but only by the terms of the appended claims.

What is claimed is:

1. An adjustable encoder comprising:
   first means for generating a continuous first signal;
   second means for generating an electrical signal responsive to said first signal;
   rotatable means mounted for rotation about a selected axis, said rotatable means having a first and a second region that alternately pass between said first means and said second means as said rotatable means rotates, said first region being constructed to prevent said first signal from actuating said second means and said second region being constructed to transmit said first signal to said second means;
   a first block means having at least one surface and movable parallel to said plane of rotation of said rotatable means, said first and second means being disposed on said surface;
   base means having a first surface, said first block means being slidably disposed on said first surface of said base means; and
   means for moving said first means and said second means simultaneously in a direction parallel to the plane of rotation of said rotatable means while said rotatable means is rotating and while said second means is generating said electrical signal; said moving means comprising screw means having an axis parallel to said plane of rotation, said first block means having therein a threaded bore threadedly receiving said screw means, and said screw means being mounted on said first surface of said base means rotatably about its said axis, said screw means and said base means cooperating to ensure that rotational adjustment of said screw means results in said first block means being moved along said surface of said base means in said direction, the distance moved by said first block means, said first means and said second means being proportional to the angle through which said screw means is rotated; said first means comprising a light source; said second means comprising a photoelectric element.

2. The encoder of claim 1, further comprising second block means disposed directly on said surface of said first block means, said second block means including identical first and second portions integral with each other, each of said portions having a small bore therein and said first and second means each being accommodated in a respective one of said small bores.

3. The encoder of claim 1, wherein said first block means is provided with a cavity for accomodating electronic circuitry to be connected to said second means.

4. The encoder of Claim 1, further comprising:
   an axle on which said rotatable means is mounted for rotation, said rotatable means comprising a first disc; third block means disposed slidably on said base means and being slidable responsive to rotation of second screw means disposed on said base means;
   third and fourth means respectively identical to said first and second means, said third and fourth means being supported by said third block means; and
   second rotatable means comprising a second disc mounted for rotation about said selected axis and in a plane between said third and fourth means; said second rotatable means permitting, one time per revolution of said second disc, transmission to said fourth means of a signal generated by said third means.

* * * * *